US010885785B2

(12) United States Patent
Xu et al.

(10) Patent No.: US 10,885,785 B2
(45) Date of Patent: Jan. 5, 2021

(54) NETWORK-CONTROLLABLE PHYSICAL RESOURCES FOR VEHICULAR TRANSPORT SYSTEM SAFETY

(71) Applicant: AT&T Intellectual Property I, L.P., Atlanta, GA (US)

(72) Inventors: Tan Xu, Bridgewater, NJ (US); Eric Zavesky, Austin, TX (US); Bernard S. Renger, New Providence, NJ (US); Behzad Shahraray, Holmdel, NJ (US); David Crawford Gibbon, Lincroft, NJ (US); Zhu Liu, Marlboro, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 86 days.

(21) Appl. No.: 16/209,784

(22) Filed: Dec. 4, 2018

(65) Prior Publication Data

US 2020/0175873 A1 Jun. 4, 2020

(51) Int. Cl.

| | |
|---|---|
| ***G06F 17/10*** | (2006.01) |
| ***G06G 7/78*** | (2006.01) |
| ***G08G 1/16*** | (2006.01) |
| ***G08G 1/087*** | (2006.01) |
| ***G08G 1/005*** | (2006.01) |

(52) U.S. Cl.

CPC ............ *G08G 1/164* (2013.01); *G08G 1/005* (2013.01); *G08G 1/087* (2013.01); *G08G 1/166* (2013.01)

(58) Field of Classification Search

CPC ........ G08G 1/164; G08G 1/005; G08G 1/087; G08G 1/166; G08G 1/012; G08G 1/0967

USPC ......................................................... 701/301

See application file for complete search history.

(56) References Cited

U.S. PATENT DOCUMENTS

| | | | |
|---|---|---|---|
| 9,517,767 B1 | 12/2016 | Kentley et al. | |
| 9,535,423 B1 | 1/2017 | Debreczeni | |
| 9,630,619 B1 | 4/2017 | Kentley et al. | |
| 9,766,626 B1 | 9/2017 | Zhu et al. | |
| 2016/0231746 A1 | 8/2016 | Hazelton et al. | |
| 2017/0213460 A1 | 7/2017 | Massey et al. | |
| 2018/0040240 A1 * | 2/2018 | Newman ................ | G08G 1/166 |
| 2018/0157265 A1 | 2/2018 | Kentley-Klay et al. | |
| 2018/0061237 A1 | 3/2018 | Erickson et al. | |
| 2018/0074501 A1 | 3/2018 | Boniske et al. | |
| 2018/0173237 A1 | 6/2018 | Reiley et al. | |

(Continued)

FOREIGN PATENT DOCUMENTS

WO 2017176550 A1 10/2017

*Primary Examiner* — Mahmoud S Ismail

(57) ABSTRACT

Methods, computer-readable media, and apparatuses for adjusting at least one network-controllable physical resource in response to detecting that a network-connected vehicle comprises a potential hazard to an animate being with a registered safety need are disclosed. In one example, a processing system including at least one processor may identify a network-connected vehicle and a animate being with a registered safety need, detect that the network-connected vehicle poses a potential hazard to the animate being with the registered safety need, transmit a first warning to the network-connected vehicle of the potential hazard, and adjust at least one network-controllable physical resource in response to the detecting that the network-connected vehicle poses the potential hazard to the animate being with the registered safety need.

20 Claims, 3 Drawing Sheets

100

(56) References Cited

U.S. PATENT DOCUMENTS

2018/0204453 A1* 7/2018 Harris ............... H04W 28/0247
2019/0051151 A1* 2/2019 Mueck ..................... G08G 1/07

* cited by examiner

100

200

300

NETWORK-CONTROLLABLE PHYSICAL RESOURCES FOR VEHICULAR TRANSPORT SYSTEM SAFETY

The present disclosure relates to network-based transportation management, and more particularly to devices, computer-readable media, and methods for adjusting at least one network-controllable physical resource in response to detecting that a network-connected vehicle may pose a potential hazard to an animate being with a registered safety need.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
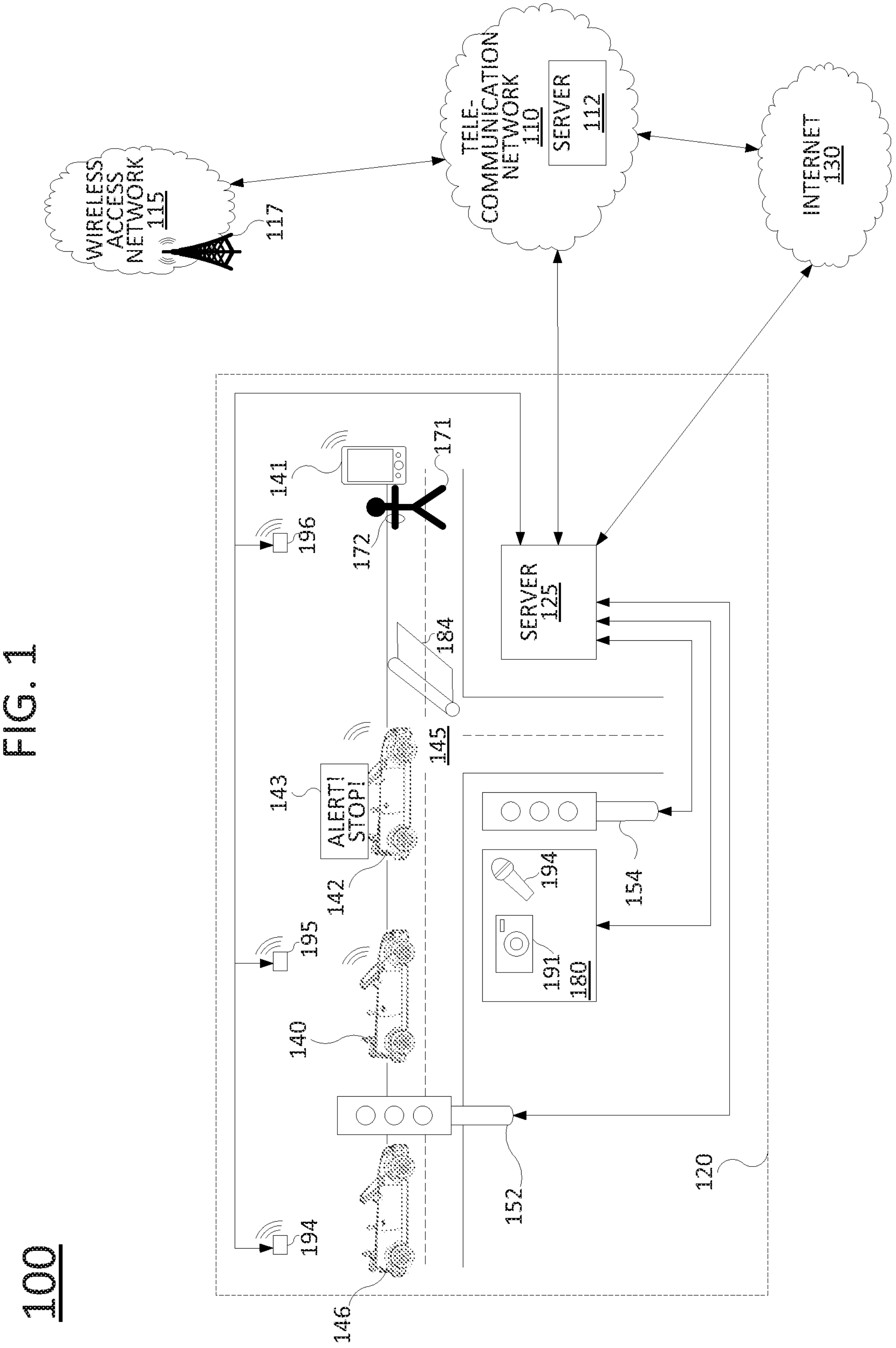
FIG. 1 illustrates an example system related to the present disclosure.

The present disclosure broadly discloses devices, non-transitory (i.e., tangible or physical) computer-readable storage media, and methods for adjusting at least one network-controllable physical resource in response to detecting that a network-connected vehicle may pose a potential hazard to a user with a registered safety need. For instance, in one example, a processing system including at least one processor may identify a network-connected vehicle and a user with a registered safety need, detect that the network-connected vehicle may pose a potential hazard to the user with the registered safety need, transmit a first warning to the network-connected vehicle of the potential hazard, and adjust at least one network-controllable physical resource in response to the detecting that the network-connected vehicle may pose the potential hazard to the user with the registered safety need.

Urban mobility is a core consideration of smart city development and often focuses on driverless cars and improved public transportation options. However, slower movers (e.g., pedestrians, bicycles, assistive scooters, wheelchairs, etc.), are generally overlooked. In this regard, examples of the present disclosure address the needs of those who may need extra assistance (e.g., children, elderly, vision impaired, hearing impaired, handicapped, etc.). For instance, in one example, the present disclosure brings together Internet of Things (IoT) devices, people, and other systems to maintain information contexts of each participant user or device (e.g., network-connected vehicles and network-controllable physical resources) to improve safety particularly for the most vulnerable users. In one example, the present disclosure may include a network-based, centralized system. Notably, self-driving vehicles may be operated at a relatively high speed, which requires a longer distance of vision/detection, or faster processing and action determination. Implementing such self-driving vehicles at such high speed will be challenging. In the present disclosure, contextual information is centrally collected and processed, resulting in only a few outputs to guide various actors as discussed below.

An example of the operations of the present disclosure may proceed as follows. A processing system may be deployed and in operation for safety and assistive control with respect to a vehicular transportation system, e.g., in a "smart city." In one example, an "animate being" with a heightened need of assistance (broadly, a human user (e.g., a pedestrian) or an animal (e.g., a service animal specifically trained to provide a service such as a service dog, a service horse, a service cat, a service bird, and the like) with a registered safety need) may be registered with the processing system. In one example, various actors (e.g., broadly including users/pedestrians and vehicles) may be registered, opted-in, and tracked by the processing system. In one example, the actors may convey contextual capabilities (e.g., steering speed, stopping speed, motion range, etc.). If such information is unavailable or not provided, the processing system may use a default model for each corresponding type of actor (e.g., a person, a car, a motorcycle, a service dog, etc.). In one example, cameras and other sensors may capture additional contextual information from the environment and provide such information to the processing system. The contextual information from the environment may be general data such as temperature, humidity, road surface conditions, noise levels, wind speed, etc. The contextual information from the environment may also include data relating to an actor, such as a person's position, gait, movement state, etc., a vehicle's position, speed, acceleration, turning moment, etc.

As actors move throughout the environment, both location information and other contextual information may be sent to the processing system to update the context knowledge for each actor. In one example, vehicular actors that are network-connected may send updates when taking an action (e.g., turning, speeding-up, slowing down, etc.). In the absence of an update, the processing system may assume a trajectory and velocity consistent with the last update. The types of contextual information provided by network-connected vehicles may include location/position information, velocity information, acceleration information, navigation system information (e.g., an intended destination), braking or acceleration capability information, cornering capability information, rollover test information, and so forth. In one example, a network-connected vehicle may also provide video or images from a dashboard camera, from a rear-facing and/or a backup camera, and so forth. In addition, some vehicles (e.g., self-driving or semi-autonomous vehicles) may be equipped with advanced sensors (e.g., LIDAR (light detection and ranging)) for detecting lanes, curbs, traffic lights, other vehicles, pedestrians, etc. Thus, these additional types of information may similarly be provided to the processing system from registered actors.

In one example, personal device(s) of an animate being, e.g., a user, with a registered safety need, e.g., a cellular telephone, a wearable computing device, etc., may provide location information and in one example, additional context information, such as video, images, or audio recordings of a surrounding environment, biometric information of the user, and so forth. In another example, personal device(s) of an animate being, e.g., a service animal, with a registered safety need, e.g., a smart collar with communication capabilities and GPS receivers, a smart leash with communication capabilities and GPS receivers, a smart vest worn by the service animal with communication capabilities and GPS receivers, an embedded chip set inserted into the physical bodies of the service animals, and the like, may provide location information and in one example, additional context information, such as video, images, or audio recordings of a surrounding environment, biometric information of the user, and so forth. The present disclosure will use a human user as an example of the broader term "animate being" in explaining various embodiments below. However, it should not be interpreted that such embodiments are only limited to a human user, but instead, be interpreted to encompass any other animate beings with registered safety needs.

In one example, additional devices in an environment, such as environmental sensors, traffic cameras, overhead or in-road traffic sensors, wireless sensors (e.g., RFID sensors, Bluetooth beacons, Wi-Fi direct sensors, etc.), devices of other users who may have volunteered their devices for the present transport safety service, and so forth, may all provide additional contextual information which may be used to detect potential traffic hazards, in particular, with respect to a user with a registered safety need.

In one example, the processing system may detect potential hazards involving network-connected vehicles and users with registered safety needs. For instance, the potential hazard may be a potential collision between a network-connected vehicle and a user with a registered safety need. The potential collision may be detected by detecting a trajectory of the network-connected vehicle, detecting a trajectory of the user with the registered safety need (which may include remaining stationary if the user is incapacitated, or unaware of any potential hazard), and determining that the trajectories may intersect. The trajectories may be determined from context information of both actors, such as position, velocity, and/or acceleration information collected by the processing system from the first network-connected vehicle, from a mobile device of the user, and/or from other sensors in an environment, e.g., a location sensor, a speed sensor, etc. Trajectories can alternatively or additionally be determined from navigation information of the first network-connected vehicle or of a mobile device of the user. For example, an autonomous or semi-autonomous vehicle may be following directions to a destination, or a user may be operating the vehicle and following directions from a vehicle-based or a network-based navigation system. Similarly, the user may be following walking directions to a destination via the user's mobile device. In one example, the processing system may determine an intersection of the trajectories in accordance with relatively static information regarding the transportation system, such as a map which may provide information on motorways, such as a number of lanes, lane widths, and directions of traffic flow, traffic light timing information, speed limit information, average speeds at particular times of days, days of the week, and weather conditions, and so forth.

In one example, the processing system may send a notification to both the network-connected vehicle involved in the context event, as well as to the user having the safety need. The notification to the network-connected vehicle comprising the potential hazard may include an alert to slow down, stop, and/or steer away from a given precise location of the user with a registered safety need. In one example, the notification to the network-connected vehicle may also provide context information, e.g., specifically informing the network-connected vehicle that the alert/instruction pertains to a potential collision with a user with a registered safety need. In one example, the processing system may alert a second network-connected vehicle of a non-responsive first network-connected vehicle (which may have failed to provide an acknowledgement in response to an alert). In such an example, the second network-connected vehicle may attempt to warn the non-responsive first network-connected vehicle via a peer-to-peer wireless communication.

The notification to the user may comprise an alert or instruction to a device of the user to present an alert in a visual format (e.g., a graphical overlay on existing screen, an augmented reality object/marker, etc.), an audio format (e.g., a machine-generated speech warning), a tactile format (e.g., vibrating shoes), etc. The notification, may include an instruction as to the best action to take to avoid the potential hazard, e.g., which direction to move, how fast or slow to move, etc.

The processing system may further send instructions to network-controllable physical resources in the environment to alter operational states, and to thereby increase the chance that a potential hazard to a user with a registered safety need can be avoided. For instance, the processing system may change a traffic light from green to red, may maintain a traffic light as red for a longer period of time (whereas a normal operating procedure would result in a change to green), may raise a barricade or close a barricade, may divert traffic by posting written instructions on controllable roadway signage, and so on. In one example, the controllable physical resources may include autonomous or semi-autonomous network-connected vehicles which can similarly be controlled to slow down, stop, or navigate elsewhere via remote instructions from the processing system. In one example, a network-connected vehicle may also be configured to provide warning information to other vehicles or other persons in a vicinity. For instance, the network-connected vehicle may be capable of and may be instructed to present a particular light pattern via taillights, headlights, and so forth. Alternatively, or in addition, the network-connected vehicle may include a controllable display screen which can be instructed to present an alert/warning and/or instructions to other vehicles and/or persons in the vicinity. Similarly, the network-connected vehicle may include external loudspeakers which may present audio alerts and/or warnings to others within hearing range.

In one example, the processing system may also directly alert other nearby actors of a potential hazard to a user with a registered safety need, such as other vehicles, other users (e.g., other pedestrians without safety needs), and so forth. For instance, for network-connected vehicles which cannot be remotely navigated by the processing system, the processing system may still be able to present instructions/warnings to human operators of such vehicles via on-board systems. Alternatively, or in addition, other users (e.g., pedestrians) nearby may be alerted via their respective personal mobile devices and may be able to render assistance to the user with the registered safety need (if such other users are willing and able to do so).

In one example, the present disclosure may summarize events and context information for analysis, e.g., to identify dangerous intersections, to identify violation-prone actors, etc. For instance, the processing system may synchronize activities (e.g., accident reports) with a detected event to provide full context of what happened. In one example, the processing system may optimize infrastructure to disable unused (or infrequently used) resources, such as traffic lights during certain times of day (e.g., after midnight). These and other aspects of the present disclosure are discussed in greater detail below in connection with the examples of FIGS. 1-3.

To aid in understanding the present disclosure, FIG. 1 illustrates an example system 100, related to the present disclosure. As shown in FIG. 1, the system 100 connects a mobile device 141, biometric sensor 172, server 112, server 125, wireless access points 194-196, sensor units (such as sensor unit 180, which may include a camera 191, a microphone 194, and so forth), vehicles 140 and 142, and network-controllable physical resources (e.g., traffic lights 152 and 154, or barricade 184) with one another and with various other devices via a core network, e.g., a telecommunication network 110, a wireless access network 115 (e.g., a cellular network), and Internet 130. In the example of FIG. 1, wireless access points 194-196, traffic lights 152 and 154, barricade 184, and server 125 may be components of a transportation service provider network 120. The transportation service provider network 120 may comprise a Local Area Network (LAN), e.g., an Ethernet network, a wireless local area network (WLAN), e.g., an Institute for Electrical and Electronics Engineers (IEEE) 802.11 network (e.g., a Wi-Fi network), an IEEE 802.15, e.g., a Bluetooth network, a ZigBee network, and so forth, or a combination of interconnected devices using a plurality of such communication modalities and protocols. In one example, the transportation service provider network 120 may comprise a dedicated short range communication (DSRC) network. For example, a DSRC network may be operated by a governmental entity or a private entity managing a transportation region on behalf of a governmental entity. In general, DSRC networks enable wireless vehicle-to-vehicle (V2V) communications and vehicle-to-infrastructure (V2I) communications. The wireless access points 194-196 may comprise IEEE 802.11 (Wi-Fi) routers, IEEE 802.15 access points (e.g., "Bluetooth" access points, "ZigBee" access points, etc.), and so forth. In one example, the wireless access points 194-196 may be referred to as roadside units (RSUs).

Figure 3:
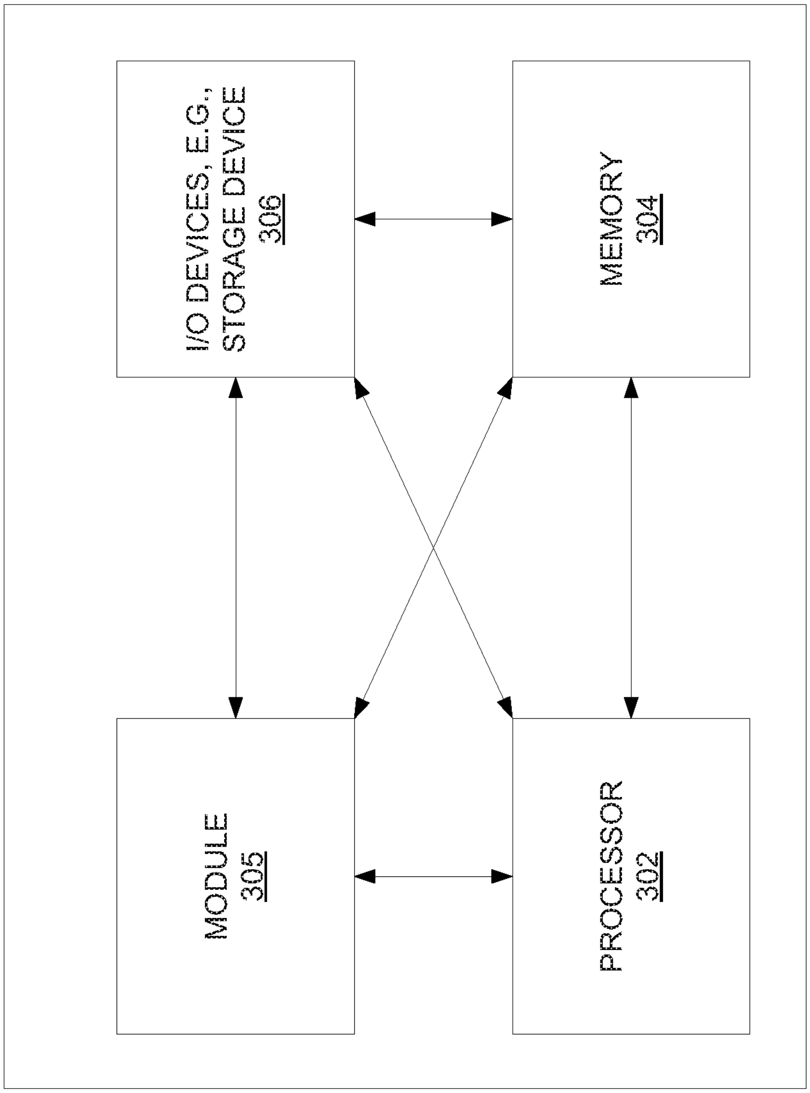
FIG. 3 illustrates a high-level block diagram of a computing device specially programmed to perform the functions described herein.

In one example, the server 125 may comprise a computing system, such as computing system 300 depicted in FIG. 3, and may be configured to provide one or more functions for adjusting at least one network-controllable physical resource in response to detecting that a network-connected vehicle may pose a potential hazard to a user with a registered safety need, in accordance with the present disclosure. For example, server 125 may be configured to perform one or more steps, functions, or operations in connection with the example method 200 described below. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, the system 100 includes a telecommunication network 110. In one example, telecommunication network 110 may comprise a core network, a backbone network or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs), and so forth. It should be noted that an IP network is broadly defined as a network that uses Internet Protocol to exchange data packets. However, it will be appreciated that the present disclosure is equally applicable to other types of data units and transport protocols, such as Frame Relay, and Asynchronous Transfer Mode (ATM). In one example, the telecommunication network 110 uses a network function virtualization infrastructure (NFVI), e.g., host devices or servers that are available as host devices to host virtual machines comprising virtual network functions (VNFs). In other words, at least a portion of the telecommunication network 110 may incorporate software-defined network (SDN) components.

As shown in FIG. 1, telecommunication network 110 may also include a server 112. In one example, the server 112 may comprise a computing system, such as computing system 300 depicted in FIG. 3, and may be configured to provide one or more functions for adjusting at least one network-controllable physical resource in response to detecting that a network-connected vehicle may pose a potential hazard to a user with a registered safety need, in accordance with the present disclosure. For example, server 112 may be configured to perform one or more steps, functions, or operations in connection with the example method 200 described below. For instance, server 112 may collect, store, and provide users' biometric data, users' position/location information, and other contextual information which may be utilized in connection with the example method 200 described herein. For ease of illustration, various additional elements of telecommunication network 110 are omitted from FIG. 1.

In one example, wireless access network 115 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 115 may comprise an access network in accordance with any "second generation" (2G), "third generation" (3G), "fourth generation" (4G), Long Term Evolution (LTE) or any other existing or yet to be developed future wireless/cellular network technology. While the present disclosure is not limited to any particular type of wireless access network, in the illustrative example, wireless access network 115 is shown as a UMTS terrestrial radio access network (UTRAN) subsystem. Thus, base station 117 may comprise a Node B or evolved Node B (eNodeB). As illustrated in FIG. 1, mobile device 141 may be in communication with base station 117, which provides connectivity between mobile device 141 and other endpoint devices within the system 100, various network-based devices, such as server 112, and so forth. In addition, in one example biometric sensor 172, and vehicles 140 and 142 may also be in communication with base station 117, e.g., where these components may also be equipped for cellular communication. In one example, wireless access network 115 may be operated by the same or a different service provider that is operating telecommunication network 110.

In one example, vehicles 140 and 142 may each be equipped with an associated on-board unit (OBU) (e.g., a computing device and/or processing system) for communicating with server 112, server 125, or both, either via the wireless access network 115 (e.g., via base station 117), via the transportation service provider network 120 (e.g., via wireless access points 194-196), or both. For example, the OBU may include a global positioning system (GPS) navigation unit that enables the driver to input a destination, and which determines the current location, calculates one or more routes to the destination, and assists the driver in navigating a selected route. In one example, the server 125 may provide navigation assistance in addition to providing operations for adjusting at least one network-controllable physical resource in response to detecting that a network-connected vehicle may pose a potential hazard to a user with a registered safety need, as described herein. In addition, in one example, either or both of vehicles 140 and 142 may comprise autonomous or semi-autonomous vehicles which may handle various vehicular operations, such as braking, accelerating, slowing for traffic lights, changing lanes, etc. For instance, vehicles 140 and 142 may include LIDAR systems, GPS units, and so forth which may be configured to enable vehicles 140 and 142 to travel to a destination with little to no human control. Also shown in FIG. 1 is a vehicle 146, which for illustrative purposes may comprise a non-autonomous vehicle, which may be fully user-operated, and which may not include network communication capabilities.

In an illustrative example, user 171 may be registered with server 125 as a user with a safety need. For instance, user 171 may have a broken leg and may be walking on crutches, may be partially paralyzed and may be utilizing a wheelchair, and so forth. User 171 may register himself or herself, or may be registered by a caregiver, e.g., a doctor, a parent, etc. In one example, user 171 may consent (e.g., opted-in) to have telecommunication network 110 monitor the user 171 for conditions which may be indicative that the user 171 has a safety need, and the telecommunication network 110 may then register the user 171 when such condition(s) is/are detected. For example, biometric sensor 172, e.g., a wearable device, may capture biometric data of user 171 and may transmit the biometric data to server 112 via a wireless connection to base station 117 and/or to one of wireless access points 194-196. For instance, biometric sensor 172 may include a transceiver for IEEE 802.11 based communications, IEEE 802.15 based communications, and so forth.

The biometric sensor 172 may comprise one or more of: a heart rate monitor, an electrocardiogram device, an acoustic sensor, a sensor for measuring a breathing rate of a user, a galvanic skin response (GSR) devices, an event-related potential (ERP) measurement device, and so forth. For example, the biometric sensor 172 may measure or capture data regarding various physical parameters of user 171 (broadly, "biometric data"). For instance, the biometric sensor 172 may record the user's heart rate, breathing rate, skin conductance and/or sweat/skin moisture levels, temperature, blood pressure, voice pitch and tone, body movements, e.g., eye movements, hand movements, and so forth. In another example, the biometric sensor 172 may measure brain activity, e.g., electrical activity, optical activity, chemical activity, etc., depending upon the type of biometric sensor.

In one example, mobile device 141 may comprise any subscriber/customer endpoint devices configured for wireless communication such as a laptop computer, a Wi-Fi device, a Personal Digital Assistant (PDA), a mobile phone, a smartphone, an email device, a computing tablet, a messaging device, and the like. In one example, mobile device 141 may have both cellular and non-cellular access capabilities and may further have wired communication and networking capabilities. In one example, mobile device 141 may be associated with user 171. In addition, in one example, biometric sensor 172 may not be equipped for cellular communications. However, biometric data of user 171 captured via biometric sensor 172 may still be conveyed to server 112 via wireless access network 115 by mobile device 141. For instance, biometric sensor 172 may have a wired or wireless connection (e.g., an IEEE 802.15 connection) to mobile device 141. In addition, mobile device 141 may be configured to forward the biometric data to server 112 using cellular communications via base station 117 and wireless access network 115. In any case, server 112 may detect various conditions, such as user 171 falling, suffering a seizure, stumbling, and so forth by comparing the biometric data to one or more signatures (e.g., machine learning models (MLMs) trained to detect various conditions). When such a condition is encountered, server 112 may therefore register user 171 with server 125 as a user with a safety need.

In one example, the server 125 may gather contextual information from various sources to determine when there may be a potential hazard to the user 171 (in the present example user 171 is now considered a user with a registered safety need). The contextual information may be obtained from server 112. For instance, server 112 may provide to server 125 position/location information of mobile device 141 (which is indicative of the position/location of user 171). In one example, server 112 may also provide biometric information of user 171 to server 125. For instance, in one example, server 125 may detect a biometric event relating to the user 171 and activate a protection mode in response to detecting the biometric event. For instance, user 171 may suffer from seizures. The user 171 may be trusted to safely navigate as a pedestrian under normal conditions and thus the server 125 may not engage network-controllable resources for such user under normal conditions. However, once a seizure episode is detected, the server 125 may then provide monitoring for the user 171.

In addition, relevant biometric data for user 171 may also be gathered by server 125 from other devices, such as mobile device 141, camera 191, and so forth. For example, mobile device 141 may capture video or still images of the user's face, gait, and so forth. Similarly, the mobile device 141 may record audio data of the user's voice from which pitch, tone, and other parameters may be calculated. Alternatively, or in addition, words and phrases in the audio data may also be determined, e.g., using speech recognition techniques. It should be noted that in one example, the user 171 may have affirmatively granted permission (e.g., opting into the service with specific permission to allow the gathering and use of the users biometric data) to the telecommunication network 110 to gather biometric data regarding the user 171, to use the biometric data to determine a condition indicative of a safety need, to share the biometric data with the transportation service provider network 120 (e.g., server 125) and/or to register the user 171 with server 125 as a user with a safety need, and so forth.

Other contextual information may include position, speed, and velocity information of vehicles 140, 142, and 146. It should be noted that vehicles 140 and 142 may report such information to server 125 via respective on-board units (OBUs). However, in one example, such information for vehicle 146 may be obtained via sensors in transportation service provider network 120, such as camera 191, overhead speed sensors or in-road speed sensors (not shown), and so forth. In one example, contextual information may also include navigation information for vehicle 140, vehicle 142, and/or user 171 (e.g., mobile device 141).

In one example, server 125 may determine trajectories of the various actors to determine that one (or more) vehicles and the user 171 are on a potential collision course. For instance, server 125 may determine that vehicle 140 may pose a potential hazard to user 171 based upon the server 125 calculating intersecting trajectories of the vehicle 142 and user 171. In response, server 125 may attempt to transmit a warning to the vehicle 140. For instance, server 125 may attempt to communicate with an OBU of vehicle 140 via wireless access points 194-195, base station 117, or both. If vehicle 140 is an autonomous or semi-autonomous vehicle, the warning may include one or more instructions to change the operation of the vehicle 140, e.g., to slow down or stop, to change lanes, to turn onto a different road, etc. In one example, the warning may include an audio alert, a textual alert or other visual alerts, and so forth. For example, the OBU of vehicle 140 may present the alert via one or more modalities for an operator and/or occupant of the vehicle. In one example, the warning may identify the nature of the potential hazard (e.g., specifically stating that the reason for the warning is a potential collision with a user having a registered safety need). In an example where vehicle 140 is not an autonomous vehicle, the warning may include specific instructions to be presented to a user/operator. For instance, the warning may include audio instructions to slow down, stop, change lanes, etc.

However, in addition to the foregoing, server 125 may not trust that the warning (and/or any instructions which may be contained therein) is received by vehicle 140 (or the user/operator). As such, server 125 may take additional actions in the event that the warning is not heeded or the instructions are not executed. For example, server 125 may provide a warning to the user 171 via mobile device 141. The warning may include an audio warning, a textual or other visual warnings, a tactile warning, and so forth. In addition, server 125 may select one or more network-controllable physical resources which may be instructed to change operational states in order to help avoid the potential hazard to user 171 from vehicle 140. For instance, server 125 may send an instruction to the barricade 184 to be raised or lowered to impede or restrict a flow of vehicular traffic on the roadway 145 (e.g., when it is determined that such action is safe and will not introduce an additional hazard to other actors). In such an example, it may be anticipated by server 125 that the barricade 184 may be raised to stop vehicle 140 before the vehicle 140 approaches the user 171. For instance, server 125 may calculate when the vehicle 140 may be at the location of barricade 184 and determine that there is more than sufficient time to raise the barricade 184 before the vehicle 140 arrives.

In one example, server 125 may alternatively or additionally control one or more traffic lights, e.g., to change to red, or to be maintained as red to stop traffic near the user 171, including the vehicle 140. For instance, traffic light 154 may be on one side of the roadway 145 and may be changed to red in an attempt to stop the vehicle 140. In still another example, a network-controllable physical resource may comprise an autonomous vehicle that can be selected by the server 125 and remotely controlled in an attempt to avoid the potential hazard to user 171 from vehicle 140. For instance, server 125 may send an instruction to vehicle 142 to change an operational state thereof, e.g., to slow down or stop, to move between lanes to block traffic, and so forth. In this regard, it should be noted that in one example, vehicle 142 may be configured to provide an alert to other actors nearby (other vehicles, other vehicle operators, pedestrians, etc.) that the vehicle 142 has been remotely instructed to take action for safety purposes. For instance, vehicle 142 may be specifically equipped with a display 143 that can be instructed to present a warning, such as "ALERT! STOP!". Similarly, vehicle 142 may be equipped to display a designated light pattern via headlights, taillights, etc. which is indicative of a potential safety event. For instance, a governmental authority may designate a light pattern which is reserved for such a safety alert, and which is therefore expected to be understood and obeyed by various parties. Accordingly, even if vehicle 140 does not receive the warning, or is incapable of or does not heed the warning and/or instructions contained therein, the server 125 may deploy one or more redundancies to help ensure that the potential hazard to user 171 from vehicle 140 is avoided. Nevertheless, in one example, the server 125 may also instruct vehicle 142 to provide wireless peer-to-peer alerts to other actors nearby, which may include vehicle 140, mobile devices of other pedestrians, and so forth. As such, there is a chance that the warning from server 125 may still be received indirectly by vehicle 140. In addition, alerts to devices of nearby pedestrians or other users may result in one or more bystanders volunteering to render assistance. For example, if user 171 has fallen in a crosswalk, other bystanders may volunteer to act and bring user 171 to a safer location. If user 171 is experiencing a seizure, a knowledgeable bystander may help protect the user 171 from injury on the ground, and so on.

It should be noted that in another example, the server 125 may detect a potential hazard to user 171 from a human-operated, non-network connected vehicle, e.g., vehicle 146. In such an example, the potential hazard may still be avoided by controlling traffic light 152 to turn red. In the event that it is too late to stop vehicle 146 at traffic light 152, traffic light 154, which is closer to user 171 may be similarly changed to a red signal. In addition, vehicle 142 and/barricade 184 may be controlled to stop the flow of traffic on roadway 145. Thus, even if the operator of vehicle 146 may be inclined to disregard the red lights, vehicle 146 can still be prevented from approaching user 171.

It should also be noted that the system 100 has been simplified. In other words, the system 100 may be implemented in a different form than that illustrated in FIG. 1. For example, the system 100 may be expanded to include additional networks, and additional network elements (not shown) such as wireless transceivers and/or base stations, border elements, routers, switches, policy servers, security devices, gateways, a network operations center (NOC), a content distribution network (CDN) and the like, without altering the scope of the present disclosure. In addition, system 100 may be altered to omit various elements, substitute elements for devices that perform the same or similar functions and/or combine elements that are illustrated as separate devices.

As just one example, one or more operations described above with respect to server 112 may alternatively or additionally be performed by server 125, and vice versa. In addition, although individual servers 112 and 125 are illustrated in the example of FIG. 1, in other, further, and different examples, the same or similar functions may be distributed among multiple devices within the telecommunication network 110 and/or transportation service provider network 120 that may collectively provide various services in connection with examples of the present disclosure for adjusting at least one network-controllable physical resource in response to detecting that a network-connected vehicle comprises a potential hazard to a user with a registered safety need. Thus, these and other modifications are all contemplated within the scope of the present disclosure.

Figure 2:
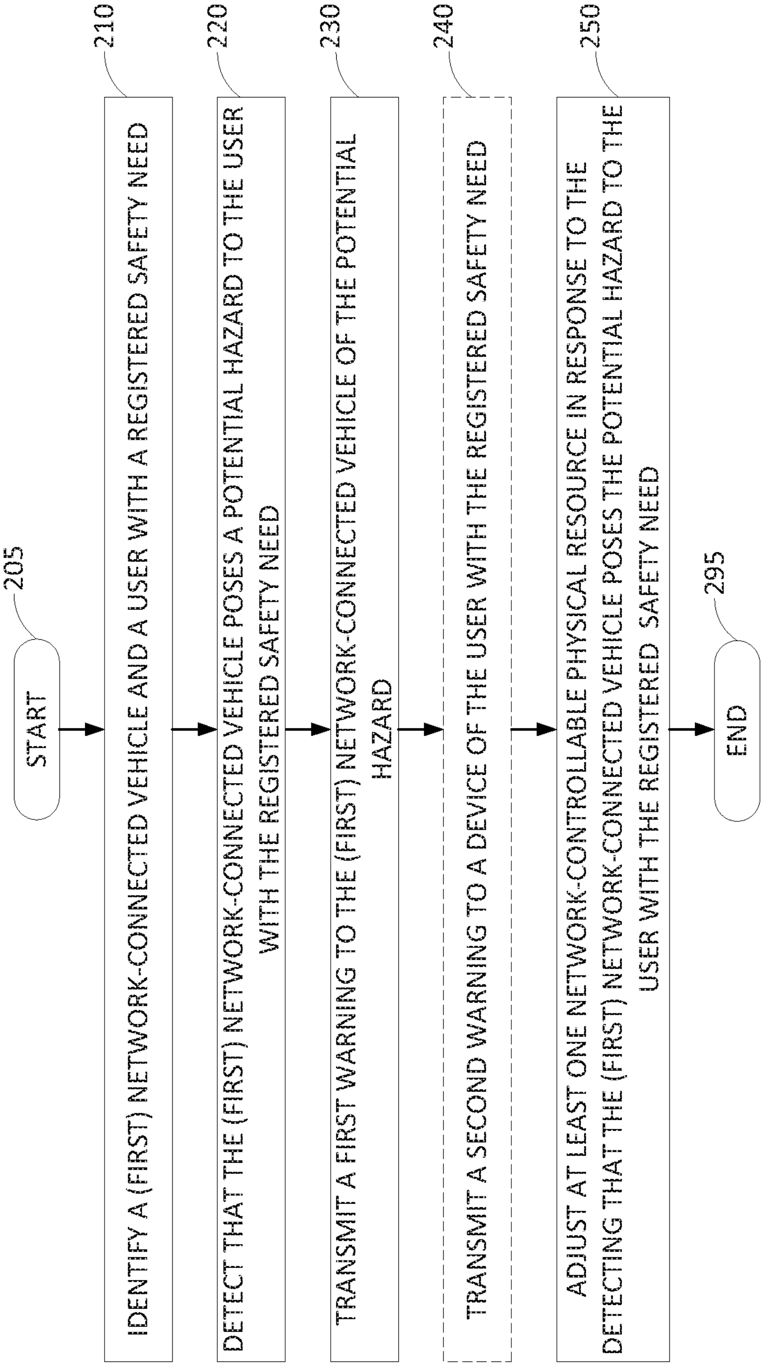
FIG. 2 illustrates a flowchart of an example method for adjusting at least one network-controllable physical resource in response to detecting that a network-connected vehicle may pose a potential hazard to a user with a registered safety need.

FIG. 2 illustrates a flowchart of an example method 200 for adjusting at least one network-controllable physical resource in response to detecting that a network-connected vehicle may pose a potential hazard to a user with a registered safety need. In one example, steps, functions and/or operations of the method 200 may be performed by a device as illustrated in FIG. 1, e.g., by one of server 112 and/or server 125, or any one or more components thereof, such as a processing system. Alternatively, or in addition, the steps, functions and/or operations of the method 200 may be performed by a processing system collectively comprising a plurality of devices as illustrated in FIG. 1, such as server 125, server 112, biometric sensor 172, mobile device 141, wireless access points 194-196, vehicles 140 and 142, network-controllable physical resources (traffic lights 152 and 154, barricade 184), and so forth. In one example, the steps, functions, or operations of method 200 may be performed by a computing device or system 300, and/or a processing system 302 as described in connection with FIG. 3 below. For instance, the computing device 300 may represent at least a portion of a server, a mobile device, a biometric sensor, and so forth in accordance with the present disclosure. For illustrative purposes, the method 200 is described in greater detail below in connection with an example performed by a processing system, such as processing system 302. The method 200 begins in step 205 and proceeds to step 210.

At step 210, the processing system identifies a first network-connected vehicle and an animate being, e.g., a human user, with a registered safety need. For instance, the user with the registered safety need may comprise a child, a hearing-impaired person, a vision-impaired person, a person with an ambulatory impairment, a person with a cognitive impairment, a person under treatment with prescription medication, or a person under the influence of a substance. In one example, the safety need is registered with the processing system by at least one of the user with the safety need, a caregiver of the user with the safety need, or a device of the user with the safety need. In one example, the safety need may also be detected and/or registered by other devices in an environment, such as a cameras or other sensors for gait analysis, facial analysis, speech analysis, etc. For instance, movements indicative of an impairment of the user may be detected, and the user may then be registered as impaired. Alternatively, or in addition, the user may be registered as having a safety need, but additional protections (e.g., in accordance with the method 200) may be activated when a specific biometric event is detected (e.g., an impaired gait is detected, a fall is detected, a seizure is detected, etc.).

In one example, the user with the registered safety need is identified via at least one of a device of the user with the registered safety need or at least one sensor device deployed in an environment that is in communication with the processing system. For example, the at least one device of the user may include a mobile device, smart glasses, a smartwatch or other wearable devices, biometric sensor(s), an RFID tag and/or transponder, and so forth. Identification may include the identity of the user with the registered safety need as well as the user's location. Identification via sensor device(s) may also include contextual information from cameras, microphones, or other sensors for gait recognition, facial recognition, speech recognition, etc. to identify the user with the registered safety need (and to also place the user at a location at or near to the sensor device(s) identifying the user).

In one example, the first network-connected vehicle is identified via at least one of a communication from the first network-connected vehicle or at least one sensor device deployed in an environment that is in communication with the processing system. For example, the first network-connected vehicle may transmit the vehicle's location (e.g., measured via an onboard GPS or the like), as well as identifying information (e.g., an identification number (ID) or serial number) to the processing system. The information may be transmitted via one or more modalities, e.g., via a cellular-network, via a dedicated short range communication (DSRC) network, and so forth. Identification of the first network-connected vehicle via sensor device(s) may also include contextual information from cameras, microphones, wireless sensors (e.g., RFID, Bluetooth, Wi-Fi direct, etc.), overhead traffic sensors, in-road traffic sensors (e.g., pressure sensors, or the like), or other sensors for object detection and recognition (e.g., determining a moving car from video of a roadway via a machine learning model/object recognition model for a "car"). Identification may include not only the identification of the first network-connected vehicle but also the vehicle's location, which may be inferred from known locations of the sensor(s), and or interpolated more accurately from detections from multiple sensor(s).

At step 220, the processing system detects that the first network-connected vehicle comprises a potential hazard to the user with the registered safety need. For example, the potential hazard may comprise a potential collision between the first network-connected vehicle and the user with the registered safety need. In one example, step 220 may include detecting a first trajectory of the first network-connected vehicle, detecting a second trajectory of the user with the registered safety need, and determining that the first trajectory and the second trajectory intersect. The trajectories may be determined from context information such as position, velocity, and/or acceleration information collected by the processing system from the first network-connected vehicle, from a mobile device of the user, and/or from other sensors in an environment, e.g., a location sensor, a speed sensor, etc. Trajectories can alternatively or additionally be determined from navigation information of the first network-connected vehicle or of a mobile device of the user. In one example, the processing system may determine an intersection of the trajectories in accordance with information regarding a transportation system, such as a motorway map, traffic light timing information, speed limit information, average speeds at particular times of days, days of the week, and weather conditions, and so forth.

At step 230, the processing system transmits a first warning to the first network-connected vehicle of the potential hazard. In one example, the first network-connected vehicle is controllable by the processing system, and the first warning may include a command to alter an operation of the first network-connected vehicle to avoid the potential hazard. For instance, the processing system may send and instruction/command to the first network-connected vehicle to slow down, stop, change lanes, turn, etc. Alternatively, or in addition, the first warning may be presented via the first network-connected vehicle to an operator of the vehicle, e.g., an audio warning, a visual warning, a tactile warning, etc. In such an example, the first warning may include an instruction or suggestion to the operator for one or more actions, e.g., slow down, stop, change lanes, etc.

At optional step 240, the processing system may transmit a second warning to a device of the user with the registered safety need. For instance, the second warning may be presented via the device of the user with the registered safety need and may include an audio warning, a visual warning, a tactile warning (e.g., a vibrating phone, a vibrating watch or shoes, etc.). The second warning may also include visual, audio, and/or tactile guidance to best avoid the potential hazard. For instance, the user may be in a safe location and may be instructed to stay put, rather than to continue walking into a crosswalk and putting the user on a potential collision course with the network-connected vehicle.

At step 250, the processing system adjusts at least one network-controllable physical resource in response to the detecting that the network-connected vehicle comprises the potential hazard to the user with the registered safety need. For instance, the at least one network-controllable physical resource may comprise at least one of a traffic signal or a barricade. In one example, the at least one network-controllable physical resource comprises a second network-connected vehicle. In such an example, step 250 may include transmitting an instruction to the second network-connected vehicle to alter an operation of the second network-connected vehicle. In one example, step 250 may include adjusting both a traffic signal and a second network-connected vehicle.

In one example, an instruction to the second network-connected vehicle may comprise an instruction to activate at least one signal of the second network-connected vehicle, where the at least one signal comprises a warning to other vehicles or vehicle operators in a vicinity of the second network-connected vehicle (e.g., within wireless communication range, within hearing or sight range, etc.). In one example, the at least one signal may comprise a visual signal, an audio signal, or a wireless communication signal. For instance, the at least one signal may comprise a vehicle-to-vehicle (V2V) wireless warning message, may comprise special lights, or special taillight and/or headlight pattern(s) which may be designated as warnings and which may be known to other drivers or other vehicles' on-board computing systems, and so forth. Alternatively, or in addition, the at least one signal may comprise external audio which may be audible to nearby vehicles and/or the drivers/vehicle occupants of such nearby vehicles.

In one example, the second network-connected vehicle may be an autonomous vehicle or semi-autonomous vehicle that is owned or controlled by a civil authority responsible for a transportation system, or may be a vehicle that is opted-in by an owner or operator to be utilized in connection with avoiding potential hazards. In one example, the processing system selects the second network-connected vehicle as the at least one network-controllable physical resource in response to detecting that the second network-connected vehicle is between the first network-connected vehicle and the user with the registered safety need.

Following step 250, the method 200 proceeds to step 295. At step 295, the method 200 ends.

It should be noted that the method 200 may be expanded to include additional steps, or may be modified to replace steps with different steps, to combine steps, to omit steps, to perform steps in a different order, and so forth. For instance, in one example the processing system may repeat one or more steps of the method 200 with respect to the same user, but different potential hazards, with respect to one or more different users, and so forth. In one example, the method 200 may be expanded to include detecting a biometric event relating to the user, and activating a protection mode of the processing system in response to detecting the biometric event. In still another example, the method 200 may be modified to detect a potential hazard from a non-network-connected vehicle, and to utilize network-controllable physical resource(s) in accordance with step 250 to avoid such a potential hazard. Thus, these and other modifications are all contemplated within the scope of the present disclosure.

In addition, although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

In one embodiment, the present method can be adapted to "inanimate beings" as well. For example, some automated devices, e.g., drones and robots, may have very specific applications with very limited sensory capabilities, e.g., with a very limited set of sensors. Such "inanimate beings" may also have registered safety needs in certain scenarios. For example, an automated robot may be tasked with walking a pet within a very limited geographic location, e.g., an area bound by geo-fencing. In this scenario, the automated robot may have very limited sensory capabilities such that it is similar to a human user with a handicap. In one alternate embodiment, the methods as described above can be applied to the inanimate beings as well.

FIG. 3 depicts a high-level block diagram of a computing device or processing system specifically programmed to perform the functions described herein. For example, any one or more components or devices illustrated in FIG. 1 or described in connection with the method 200 may be implemented as the processing system 300. As depicted in FIG. 3, the processing system 300 comprises one or more hardware processor elements 302 (e.g., a microprocessor, a central processing unit (CPU) and the like), a memory 304, (e.g., random access memory (RAM), read only memory (ROM), a disk drive, an optical drive, a magnetic drive, and/or a Universal Serial Bus (USB) drive), a module 305 for adjusting at least one network-controllable physical resource in response to detecting that a network-connected vehicle comprises a potential hazard to a user with a registered safety need, and various input/output devices 306, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for adjusting at least one network-controllable physical resource in response to detecting that a network-connected vehicle comprises a potential hazard to a user with a registered safety need (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for adjusting at least one network-controllable physical resource in response to detecting that a network-connected vehicle comprises a potential hazard to a user with a registered safety need (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:

identifying, by a processing system including at least one processor, a first network-connected vehicle and an animate being with a registered safety need;

detecting, by the processing system, that the first network-connected vehicle poses a potential hazard to the animate being with the registered safety need;

transmitting, by the processing system, a first warning to the first network- connected vehicle of the potential hazard; and adjusting, by the processing system, at least one network-controllable physical resource in response to the detecting that the first network-connected vehicle poses the potential hazard to the animate being with the registered safety need, wherein the at least one network-controllable physical resource comprises a second network-connected vehicle, wherein the adjusting the at least one network-controllable physical resource comprises transmitting an instruction to the second network-connected vehicle to alter an operation of the second network-connected vehicle, wherein the instruction comprises an instruction to navigate the second network-connected vehicle to stop or to slow a flow of vehicular traffic.

2. The method of claim 1, further comprising:

transmitting a second warning to a device of the animate being with the registered safety need.

3. The method of claim 2, wherein the second warning is presented via the device of the animate being with the registered safety need.

4. The method of claim 1, wherein the first network-connected vehicle is controllable by the processing system, wherein the first warning comprises a command to alter an operation of the first network-connected vehicle to avoid the potential hazard.

5. The method of claim 1, wherein the animate being with the registered safety need comprises:

a child;

a hearing-impaired person;

a vision-impaired person;

a person with an ambulatory impairment;

a person with a cognitive impairment;

a person under a treatment with a prescription medication;

a person under an influence of a substance; or a service animal.

6. The method of claim 5, wherein the registered safety need is registered with the processing system by at least one of:

the animate being with the registered safety need;

a caregiver of the animate being with the registered safety need; or a device of the animate being with the registered safety need.

7. The method of claim 1, wherein the first network-connected vehicle is identified via at least one of:

a communication from the first network-connected vehicle; or at least one sensor device deployed in an environment that is in communication with the processing system.

8. The method of claim 1, wherein the animate being with the registered safety need is identified via at least one of:

a device of the animate being with the registered safety need; or at least one sensor device deployed in an environment that is in communication with the processing system.

9. The method of claim 1, wherein the potential hazard comprises a potential collision between the first network-connected vehicle and the animate being with the registered safety need.

10. The method of claim 1, wherein the detecting that the first network-connected vehicle poses the potential hazard to the animate being with the registered safety need comprises:

detecting a first trajectory of the first network-connected vehicle;

detecting a second trajectory of the animate being with the registered safety need; and determining that the first trajectory and the second trajectory intersect.

11. The method of claim 1, wherein the at least one network-controllable physical resource further comprises at least one of:

a traffic signal; or a barricade.

12. The method of claim 1, wherein the adjusting the at least one network-controllable physical resource comprises adjusting both a traffic signal and the second network-connected vehicle.

13. The method of claim 1, wherein the instruction further comprises an instruction to activate at least one signal of the second network-connected vehicle comprising a warning to other vehicles or vehicle operators in a vicinity of the second network-connected vehicle.

14. The method of claim 13, wherein the at least one signal comprises:

a visual signal;

an audio signal; or a wireless communication signal.

15. The method of claim 1, wherein the processing system selects the second network-connected vehicle as the at least one network-controllable physical resource in response to detecting that the second network-connected vehicle is between the first network-connected vehicle and the animate being with the registered safety need.

16. A non-transitory computer-readable medium storing instructions which, when executed by a processing system including at least one processor, cause the processing system to perform operations, the operations comprising:

identifying a first network-connected vehicle and an animate being with a registered safety need;

detecting that the first network-connected vehicle poses a potential hazard to the animate being with the registered safety need;

transmitting a first warning to the first network-connected vehicle of the potential hazard; and adjusting at least one network-controllable physical resource in response to the detecting that the first network-connected vehicle poses the potential hazard to the animate being with the registered safety need, wherein the at least one network-controllable physical resource comprises a second network-connected vehicle, wherein the adjusting the at least one network-controllable physical resource comprises transmitting an instruction to the second network-connected vehicle to alter an operation of the second network-connected vehicle, wherein the instruction comprises an instruction to navigate the second network-connected vehicle to stop or slow a flow of vehicular traffic.

17. An apparatus comprising:

a processing system including at least one processor; and a computer-readable medium storing instructions which, when executed by the processing system, cause the processing system to perform operations, the operations comprising:

identifying a first network-connected vehicle and an animate being with a registered safety need;

detecting that the first network-connected vehicle poses a potential hazard to the animate being with the registered safety need;

transmitting a first warning to the first network-connected vehicle of the potential hazard; and adjusting at least one network-controllable physical resource in response to the detecting that the first network-connected vehicle poses the potential hazard to the animate being with the registered safety need, wherein the at least one network-controllable physical resource comprises a second network-connected vehicle, wherein the adjusting the at least one network-controllable physical resource comprises transmitting an instruction to the second network-connected vehicle to alter an operation of the second network-connected vehicle, wherein the instruction comprises an instruction to navigate the second network-connected vehicle to stop or slow a flow of vehicular traffic.

18. The apparatus of claim 17, wherein the operations further comprise:

transmitting a second warning to a device of the animate being with the registered safety need.

19. The apparatus of claim 18, wherein the second warning is presented via the device of the animate being with the registered safety need.

20. The apparatus of claim 17, wherein the first network-connected vehicle is controllable by the processing system, wherein the first warning comprises a command to alter an operation of the first network-connected vehicle to avoid the potential hazard.

* * * * *